United States Patent Office 2,824,118
Patented Feb. 18, 1958

2,824,118
SYNTHESIS OF ALIPHATIC DINITRILES AND DIAMINES

Charles E. Frank and John F. Nobis, Cincinnati, and John R. Leebrick, Miamiville, Ohio, assignors to National Distillers and Chemical Corporation, New York, N. Y., a corporation of Virginia No Drawing. Application June 17, 1954
Serial No. 437,595

16 Claims. (Cl. 260—465.2)

This invention relates broadly to novel processes for the production of nitrogen containing organic compounds and more particularly, to the production of aliphatic dinitriles and diamines from conjugated diolefins, selected alkali metals, carbon dioxide, hydrogen, and ammonia and/or related nitrogen compounds to yield the dinitriles from which the diamines as well as other derivatives are obtained if desired.

It is an object of this invention to provide a new and effective method for the production of aliphatic dinitriles and diamines utilizing relatively cheap and readily available raw materials.

It is another object of this invention to react aliphatic conjugated diolefins selectively with an alkali metal such as sodium or potassium in dispersed form to obtain the dimetallo derivatives of dimerized dienes having twice the number of carbon atoms of the starting diolefins, carbonate these products, hydrogenate the resulting mixture of unsaturated acids, to react directly the resulting diacid products with a suitable nitrogen containing compound to form the dinitriles and to hydrogenate the dinitriles to form diamines.

It is a more particular object of this invention to selectively dimerize 1,3-butadiene using finely dispersed sodium in the presence of an ether reaction medium to obtain disodiooctadienes, thereafter carbonate these products, hydrogenate the resulting ten carbon atom diacids and react the resulting saturated diacids with ammonia, urea and the like under suitable conditions to obtain $C_{10}$ diamines and dinitriles which can, in turn, be converted to other derivatives such as ten carbon atom diamines.

Another object is to provide a novel and practical method for producing in good yields and purity some heretofore unknown dinitriles and diamines and unique mixtures of dinitriles, and mixtures of diamines.

Other objectives of the invention will become apparent from the detailed description set forth below.

The present invention is carried out by initially treating an aliphatic conjugated diolefin with finely dispersed sodium or potassium in selected liquid ether medium and, if desired, in the presence of a relatively small amount of polycyclic aromatic hydrocarbon and/or in the presence of a selected solid, friable attrition agent at controlled temperatures. The reaction products obtained by the selective dimerization reaction are then carbonated at a temperature below 0° C., to give the salts of the dicarboxylic acids which are further reacted after hydrogenation with the appropriate nitrogen containing reactant to yield the desired dinitriles which upon treatment with additional hydrogen give primary diamines.

The initial step is a reaction which yields a dimerized product of the starting diolefin. For example, in the case where the initial reactants are sodium and butadiene, the dimeric product comprises the disodium derivatives of the aliphatic octadienes. A study of the structures indicates that this particular selective dimerization yields the following isomeric products:

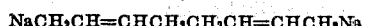
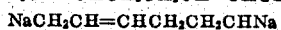
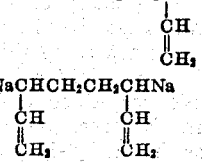

Subsequent carbonation of the above disodium derivatives followed by neutralization of the sodium salts of the acids gives yields ranging from 80 to 95% of the $C_{10}$ diacids shown below:

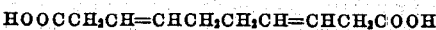
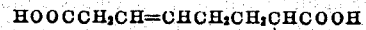
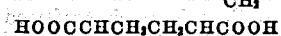

Hydrogenation of these unsaturated acids gives the corresponding hydrogenated products, sebacic acid, α-ethylsuberic acid and α,α'-diethyladipic acid.

If the reactants used are other diolefins instead of butadiene, dicarboxylic products accordingly corresponding to such structures are likewise obtained.

Following the formation of the mixture of the saturated diacids, according to this invention, the resulting mixture of the individual pure compounds are treated with ammonia and/or urea, or other ammonia producing or ammonia releasing materials under controlled conditions of temperature and pressure either with or without a catalyst to convert them directly to the dinitriles. Although presumably the transformation of the dicarboxylic acids to the corresponding dinitriles passes through the intermediates of the diammonium salts and the diamides, these disalts and diamides need not be isolated as such. Thus, the dinitriles produced from butadiene as the starting conjugated diolefin material consist predominantly of a mixture of the following compounds:

(1)   $NCCH_2CH_2—CH_2CH_2CH_2CH_2—CH_2CH_2CN$ (2)   

(3)   

The generalized formula for these dinitriles is as follows:

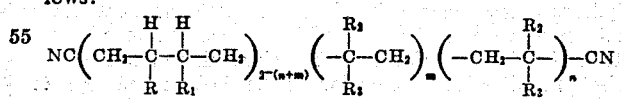

In the above formula, the letters $n$ and $m$ represent either 0 or 1; and R, $R_1$, and $R_2$ represent either an alkyl, aryl, aralkyl or alkaryl group or a hydrogen atom, and $R_3$ represents an alkyl group.

The dinitriles 1,6-dicyanooctane (α-ethylsuberonitrile) and 3,6-dicyanooctane (α,α'-diethyladiponitrile) are believed to constitute new compositions of matter. After hydrogenation, the resulting products obtained are new diamines, 1,8-diamino-2-ethyloctane and 1,6-diamino-2,5-diethylhexane.

The generalized formula for these new amines is:

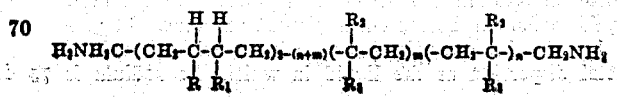

In the above generic formula, the letters $n$ and $m$ represent either 0 or 1; and R, $R_1$, and $R_2$ represent an alkyl, aryl, aralkyl or alkaryl group or a hydrogen atom, and $R_3$ represents an alkyl group.

In the further contemplation of this invention, a number of these saturated primary diamines and mixtures obtained by this process are likewise novel, and it is intended to claim them as new compositions of matter.

The diolefins which are useful for this improved process include any aliphatic conjugated diolefin such as, for example, butadiene, isoprene, dimethylbutadiene, the pentadienes, such as the methyl-1,3-pentadienes, and the like. In general, it is desirable to use the conjugated aliphatic diolefins having from 4 to 8, inclusive, carbon atoms. Diolefins having more than about eight carbon atoms yield final dinitriles and diamines containing relatively large numbers of isomeric products and such mixtures give increasing separation difficulties although the mixed products can be made by this method. Butadiene is particularly suited for use as the diolefin reactant.

Either sodium or potassium can be used as the alkali metal reactant. Sodium is much preferred over potassium since it has been found that sodium gives excellent selectivity and yields of dimerized products, and it is cheaper and more readily available. Mixtures containing a major proportion of sodium are also useful.

One factor in the successful production of the initial dimerized derivatives is the use of the alkali metal in dispersed form. If bulk sodium is used instead of dispersed sodium, it either yields no product or results largely in the formation of highly condensed polymers from the diolefin. These unwanted polymers can be substantially completely avoided by employing the alkali metal as a dispersion. Such dispersions are most conveniently made in an inert hydrocarbon or ether preliminary to reaction with the diene.

The reaction medium most suitable for reaction of the diolefin with the alkali metal has been found to consist essentially of certain types of ethers. The ether medium can be any aliphatic mono ether having a methoxy group, in which the ratio of the number of oxygen atoms to the number of carbon atoms is not less than 1:4. Examples include dimethyl ether, methyl ethyl ether, methyl n-propyl ether, methyl isopropyl ether, and mixtures of these methyl ethers. Certain aliphatic polyethers are also satisfactory. These include the acyclic and cyclic polyethers which are derived by replacing all of the hydroxyl hydrogen atoms of the appropriate polyhydric alcohol by alkyl groups. Examples are the ethylene glycol dialkyl ethers such as the dimethyl, methyl ethyl, diethyl, methyl butyl, ethyl butyl, dibutyl, and butyl lauryl ethylene glycol ethers; trimethylene glycol dimethyl ether, glycerol trimethyl ether, glycerol dimethyl ethyl ether and the like. Generally, simple methyl monoethers such as dimethyl ether and the polyethers of ethylene glycols, such as ethylene glycol dimethyl ether are preferred. Hydrocarbon solvents such as isooctane, kerosene, toluene, and benzene cannot be used exclusively as the reaction media in the dimerization step, since they adversely affect the dimerization reaction of the diolefin and give little or no yield of dimer intermediates.

The ethers used as reaction media should not contain any groups which are distinctly reactive towards sodium. Further, the ether used must not be subject to extensive cleavage under the reaction conditions to yield irreversible reaction products during the dimerization process. Such cleavage action not only destroys the ether but also introduces into the reacting system metallic alkoxides which induce undesirable polymer forming reactions with the diolefins.

Although it is preferred that the reaction medium consist substantially of the ethers as specified, other inert liquid media can be present in limited amounts. In general, these inert media are introduced with the alkali metal dispersion as the liquid in which the sodium is suspended. These inert materials have the principal effect of diluting the ethers. As such dilution increases, a minimum concentration of ether is reached below with the dimerization promoting effect is not evident. It is necessary to maintain the level such that it will have a substantial promoting effect upon the diolefin dimerization. A 50% minimum active ether concentration is considered satisfactory.

It has also been found highly useful to employ in conjunction with the dimerization reaction one or more techniques of activation for the dimerization process. This can be done in a number of ways and has the effect of increasing the rate of reaction and making the reaction more selective. For instance, a relatively small amount of at least one compound of the polycyclic aromatic class can be included in the reaction mixture. By this term it is intended to include condensed ring hydrocarbons such as naphthalene and phenanthrene, as well as the uncondensed polycyclic compounds such as diphenyl, the terphenyls, dinaphthyl, tetraphenylethylene, and the like. The polyphenyl compounds such as diphenyl, the terphenyls, and their mixtures have been found to be particularly useful. Concentrations in the range of 0.1 to 10 wt. percent based on the amount of diolefins undergoing dimerization are ordinarily quite sufficient.

It has also been found advantageous to carry out the dimerization of the diolefin in the presence of at least one solid friable attrition agent. These activating materials have been found especially valuable for increasing the reaction rate where the dimerization is done in attrition type apparatus such as a ball mill or pebble mill. Friable materials for this purpose are those which are relatively easily pulverized in this type of apparatus. These materials can be used further either alone or in conjunction with the polycyclic aromatic compounds. Materials which are suitable for use as the solid friable attrition agents include inorganic solids such as alkali metal salts, for example, sodium chloride, sodium sulfate, and potassium sulfate. Also useful is the class of compounds which consists of metallic and non-metallic oxides which are not reactive with metallic sodium under the reaction conditions, for example, sand (silicon dioxide), diatomaceous earth, zircon, and rutile. Carbon, such as in the form of graphite, can also be used. The material can be utilized in a number of ways. For instance, the reaction can be carried out by the addition to the reaction zone of a suitable attrition agent which has been preground or otherwise adjusted to a satisfactory, useful particle size. On the other hand, a relatively coarse size salt, oxide, or other suitable material can be added to a pebble mill or ball mill and, in contact with the solid, alkali metal, the friable attrition agent is thus ground down to effective size.

It is further highly desirable in the process that the reaction temperature in the dimerization step be held below 0° C. The temperature range between −20° to −50° C. is the preferred one for diolefin dimerization. At higher temperatures, the ether diluents tend to yield cleavage products with the result that sufficient alkoxide by-products are formed to yield high molecular weight polymeric products, rather than the desired products.

While proportions of various reactants are not critical, optimum yields of the dimetallic dimer intermediates can be obtained only if the alkali metal, for instance sodium, is present in finely dispersed form and in amounts equivalent to or slightly in excess of the molecular equivalents of diolefin employed. The same relative ratio of reactants is also effective in the carbonation reaction of the dimeric derivative and in the reaction of the dicarboxylic acid with the nitrogen containing compound, with the restriction that at least two molar equivalents of reactant compound are required for each mole of dimetallic dimer.

In the general practice of the invention, the dimerized derivatives are prepared by reaction of a conjugated diolefin with the alkali metal in a suitable ether medium, in the presence of a small amount of a polycyclic aromatic hydrocarbon and/or in the presence of a selected solid friable attrition agent. The resulting dimetallic dimerized derivatives, preferably the disodium derivatives, are directly and immediately subjected to carbonation. This carbonation may be done by subjecting the dimetallicdiene derivatives to dry gaseous carbon dioxide, by contact with solid carbon dioxide or by means of a solution of carbon dioxide. The temperature is best controlled below 0° C. to avoid the formation of unwanted by-products. In the case where butadiene is the starting aliphatic diolefin, there results by this method the selective production of $C_{10}$ unsaturated dicarboxylic acids produced as their disodium salts. These resulting dicarboxylic salts are neutralized to give the unsaturated free diacids, these unsaturated diacids are hydrogenated and the resulting saturated diacids are then reacted with the suitable nitrogen-containing compound which is introduced into the mixture, either in the liquid or solid state, with or without further dilution. The temperature of this reaction is higher than that used for the dimerization and should be in the range of from 100° to 250° C. The exact temperature depends somewhat on the particular nitrogen-containing reagent and on the dibasic acids used. After substantially all of the nitrogen-containing reagent has been added to the reaction, the temperature is preferably raised somewhat in order to convert the entire products to the diamide form and then subsequently to the dinitriles. A dehydrating catalyst such as silica gel, phosphoric acid, and the like, can also be employed advantageously for dehydration. This increased temperature range should be in the range of 200° to 350° C.

The dinitriles are subsequently hydrogenated to diamines. Various catalysts and reaction conditions can be used. Reduction, for example, may be effected in the presence of liquid ammonia at 100–125° C. and 100–150 atmospheres pressure, using, for instance, a Raney nickel catalyst. Other useful catalysts include cobalt on silica or kieselguhr, platinum oxide, and cobalt-manganese-silver mixtures. Considerable excess of ammonia during the hydrogenation is especially essential so as to minimize the formation of polyamines or imines due to inter- or intra-molecular loss of ammonia.

The dinitriles can be isolated before the final hydrogenation by extraction, distillation, or other suitable means well known to those skilled in the art. In general, it is desirable to purify or separate mixtures of either the dinitriles or the diamines by distillation.

These reactions may be carried out either in a batchwise or in a continuous manner and it is not intended to limit the process to any particular method of operation.

In the instance where butadiene is the aliphatic diolefin starting material, there results from this method a mixture of $C_{10}$ dinitriles, sebaconitrile, α-ethylsuberonitrile, and α,α'-diethyladiponitrile. The two branched-chain dinitriles have been identified and are believed to constitute heretofore unknown compositions of matter. The diamine products obtained by this particular synthesis constitute a series of compounds in which the two primary amino groups are separated by from 6 to 10 carbon atoms. These are 1,10-diamino-decane, 1,8-diamino-2-ethyloctane, and 1,6-diamino - 2,5 - diethylhexane. The two branched chain diamines are believed to constitute heretofore unknown compositions of matter. If some other, higher molecular weight diolefin is employed in the initial reaction, then the structure of the final products will vary accordingly.

The dinitriles are valuable as chemical intermediates, and for solvents, plasticizers, lubricants, and textile water repellants.

The diamine products are useful in the synthesis of various types of polyamides by reaction with saturated and unsaturated di- and mono-basic acids, and in resins, and the like. They are also useful in the synthesis of polyamide fibers, plastics and rubbers, plasticizers, synthetic lubricants, polyurethanes, and other products.

One outstanding use for these diamines and especially for the mixtures of diamines so produced, is for the preparation of polyamides for fiber-forming purposes. The polyamides from the saturated, mixed $C_{10}$ diamines or from individual diamines and such dicarboxylic acids as adipic, suberic, sebacic, 2,5-diethyladipic, and 2-ethylsuberic acids and mixtures of these acids are particularly valuable. These polyamides show appropriate melting points for melt spinning and generally give finished fibers having outstanding properties.

The more detailed practice of the invention is illustrated by the following examples, wherein parts are given by weight unless otherwise specified. These examples and embodiments are illustrative only, and the invention is not in any way intended to be limited specifically thereto except as indicated by the appended claims.

*Example 1*

The initial selective dimerization reaction was carried out in a stirred reactor having a gas inlet tube extending into the body of the reaction mixture and a reflux condenser vented to a nitrogen atmosphere. This reactor system was purged with nitrogen and charged with 1000 parts of dimethyl ether, 3 parts (about 1.8 wt. percent based on the butadiene used) of para-terphenyl and 69 parts of sodium dispersed in 69 parts of isooctane. The average particle size of the sodium was 15 microns. A stream of gaseous butadiene amounting to a total of 168 parts was passed into the reactor over a 4-hour period while maintaining vigorous agitation and a reaction temperature at about —25° C. During this period the disodium derivatives of the $C_8$ butadiene dimers were formed.

Alternatively, this dimerization reaction was carried out in a ball mill as the attrition type apparatus using sodium chloride as the solid, friable attrition agent. The results and products were substantially the same as those obtained above, except that a faster reaction rate and a somewhat higher yield are obtained.

In either case, the reaction mixture containing the disodium derivatives as a slurry was carbonated by contacting it with an excess of solid carbon dioxide. After evaporation of excess $CO_2$, dimethyl ether and isooctane, a solid product consisting essentially of the sodium salts of the $C_{10}$ unsaturated dicarboxylic acids remained. An alkaline solution of the dicarboxylic acids was hydrogenated using a nickel catalyst.

The hydrogenated diacids prepared in the ball mill were precipitated by addition of mineral acid. The combined yield of 10-carbon atom diacids was 87% based on the sodium. The mixed diacids are essentially composed of sebacic acid, α,α'-diethyladipic acid, and α-ethylsuberic acid in the approximate ratio of 4:1:5.

The mixed terphenyls (ortho, meta and para isomers) can be satisfactorily substituted for the para-terphenyl. Substantially the same results and products are obtained.

The saturated mixed diacids were directly converted to the saturated dinitriles in the following manner:

A mixture of 40 parts of mixed dibasic acids (52% α-ethylsuberic acid, 38% sebacic acid, 10% α,α'-diethyladipic acid) and 20 parts urea were stirred vigorously for about 5 hours at a temperature of 160° C. in the presence of gaseous ammonia. At the end of this time, the temperature was increased to 220° C. for 15 minutes. The products were distilled from the reaction vessel to effect dehydration at atmospheric pressure until no more distillate was obtained, the maximum temperature being 340° C. The distillate was taken up in excess diethyl ether and extracted with 5% ammonium hydroxide in order to remove any unreacted acidic products and by-product ω-cyanoacids. The ether solvent was removed and the crude dinitrile distilled under reduced pressure. The fraction boiling at about 180–200°/14 mm. gave a yield of about 45% of the mixture of the dinitriles of the above acids.

Reduction of the mixture of dinitriles in liquid ammonia over Raney nickel catalyst gave 40 parts of mixed ten carbon atom diamines (93%) based on the dinitriles charged. This mixture was fractionated to give 30 parts of the branched-chain diamines boiling at 120–130° C./10 mm. and 10 parts of decamethylene diamine boiling at 135–140° C./10 mm. The decamethylene diamine was converted to the dihydrochloride which was purified by recrystallization from ether (M. P. 258–260° C.). The mixture of branched-chain diamine dihydrochlorides melted at 122–125° C.

Example 2

The saturated mixed $C_{10}$ diacids obtained in the fashion described above were extracted with benzene to dissolve the branched-chain acids. The sebacic acid is relatively insoluble. The branched-chain acids were isolated by evaporation of the benzene.

A mixture of 120 parts of the $C_{10}$ acids ($\alpha$-ethylsuberic, $\alpha,\alpha'$-diethyladipic and sebacic acids, in the ratio of 8:1:1, respectively) and 60 parts of urea were stirred vigorously for about 6½ hours at a temperature of 160° C. At the end of this time, the temperature was increased to 220° C. for 27 minutes. The products were distilled from the reaction vessel at atmospheric pressure until no more distillate was obtained, the maximum temperature being 340° C.

The distillate was taken up in excess diethyl ether and extracted with 5% ammonium hydroxide in order to remove any unreacted acidic products and by-product cyano acids. The ether solvent was removed and the crude ten carbon atom dinitriles distilled under reduced pressure. The fraction boiling at about 150–190° C./10 mm. gave 57 parts (58% yield) of the mixed dinitriles. Fractionation of this mixture gave 6 parts of $\alpha,\alpha'$-diethyladiponitrile, 36 parts of $\alpha$-ethylsuberonitrile and 6 parts of sebaconitrile boiling at 195–198° C./15 mm., $\alpha,\alpha$-diethyladiponitrile boils at 163–167° C./15 mm.; $N_D^{25}$, 1.4540; $d_4^{25}$, 0.9437; $MR_D$ calcd. 47.88, found 47.31; calcd. for $C_{10}H_{16}N_2$: C 73.25, H 9.75, N 17.07; found: C 73.04, H 9.54, N 16.88. The $\alpha$-ethylsuberonitrile boils at 184–186° C. at 55 mm.; $N_D^{25}$, 1.4440; $d_4^{25}$, 0.9229; $MR_D$ calcd. 47.88, found 47.64; calcd. for $C_{10}H_{16}N_2$: C 73.25, H 9.75, N 17.07; found C 72.98, H 9.80, N 16.80.

Example 3

A mixture of 30 parts of the benzene insoluble sebacic acid (obtained as shown above from butadiene, sodium, carbon dioxide and hydrogen) and 10 parts urea were stirred vigorously for about 4 hours at a temperature of 160° C. At the end of this time, the temperature was increased to 220° C. for 10 minutes to complete the reaction to form the dinitrile (dehydration of the diamide). The products were distilled from the reaction vessel at atmospheric pressure until no more distillate was obtained, the maximum temperature being 320° C.

The distillate was taken up in excess diethyl ether and extracted with 5% ammonium hydroxide in order to remove any unreacted acidic products and by-product cyano acids. The ether solvent was removed and the crude dinitrile distilled under reduced pressure. There was obtained 47% of sebaconitrile boiling at about 199–200° C./15 mm.

Example 4

The mixture of $C_{10}$ saturated dibasic acids as obtained in Example 1 was converted to ethyl esters and the esters fractionated. $\alpha$-Ethylsuberic acid was obtained by saponification of the resulting pure diethyl ester and was converted to the corresponding dinitrile by stirring 40 parts of the free acid with 20 parts of urea for 4 hours at a temperature of 160° C. in the presence of gaseous ammonia. At the end of this time, the temperature was increased to 220° C. for about 10 minutes. The products were distilled from the reaction vessel at atmospheric pressure until no more distillate was obtained, the maximum temperature being 315° C.

The distillate was taken up in excess diethyl ether and extracted with 5% ammonium hydroxide in order to remove any unreacted acidic products and by-product cyano acids. The ether solvent was removed and the crude dinitrile distilled under reduced pressure. The $\alpha$-ethylsuberonitrile was collected at 184–186° C./15 mm.

Example 5

$\alpha,\alpha'$-Diethyladipic acid was separated from the mixture of $C_{10}$ saturated dibasic acids by fractionation of the methyl esters and subsequent saponification of the pure esters. A mixture of 70 parts of this acid and 20 parts urea was stirred vigorously for about 5½ hours at a temperature of 160° C. in the presence of gaseous ammonia. At the end of this time the temperature was increased to 220° C. for 30 minutes. The products were distilled from the reaction vessel at atmospheric pressure until no more distillate was obtained, the maximum temperature being 325° C. The distillate was taken up in excess diethyl ether and extracted with 3% ammonium hydroxide in order to remove any unreacted acidic products and by-product cyano acids. The ether solvent was removed and the crude dinitrile distilled under reduced pressure. The fraction boiling at about 163–164° C./15 mm. was identified as $\alpha,\alpha'$-diethyladiponitrile.

Example 6

Reduction of 82 parts of $\alpha$-ethylsuberonitrile in liquid ammonia over Raney nickel gave 60 parts of the $C_{10}$ diamine, 1,8-diamino-2-ethyloctane. The boiling point was 138–142° C./10 mm., and the melting point was 26–27° C. Calcd. for $C_{10}H_{24}N_2$: C 69.80, H 13.95, N 16.28; found: C 69.46, H 14.08, N 16.20. The diamine dihydrochloride melted at 160–161° C. Calcd. for $C_{10}H_{26}N_2Cl_2$: C 49.00, H 10.58, N 11.42, Cl 28.92; found: C 48.87, H 10.44, N 11.58, Cl 28.88.

Example 7

Reduction of 82 parts of $\alpha,\alpha'$-diethyladiponitrile in liquid ammonia over Raney nickel gave 60 parts of the $C_{10}$ diamine, 1,6-diamino-2,5-diethylhexane, boiling at 106–110° C./6 mm. Calcd. for $C_{10}H_{24}N_2$: C 69.80, H 13.95, N 16.28; found: C 69.71, H 13.81, N 16.51. The diamine dihydrochloride melted at 154–156° C. Calcd. for $C_{10}H_{26}N_2Cl_2$: Cl 28.92; found: Cl 28.25.

Example 8

Reduction of 82 parts of sebaconitrile in liquid ammonia over Raney nickel gave 78 parts of decamethylene diamine melting at 60–61° C. The diamine dihydrochloride melted at 258–260° C.

What is claimed is:

1. As a novel composition of matter, a mixture of isomeric saturated aliphatic primary diamines having at least 10 carbon atoms per molecule and all the diamines in said mixture having the same number of carbon atoms and in which the amino groups are separated by at least six carbon atoms and which mixture is further characterized by containing, in major amount, isomeric diamines containing at least one $C_2$ saturated branch chain.

2. As a novel composition of matter, a mixture of 1,8-diamino-2-ethyloctane, 1,6-diamino-2,5-diethylhexane, and decamethylene diamine, said mixture being further characterized in that (1) its content of decamethylene diamine is less than the sum of 1,8-diamino-2-ethyloctane and 1,6-diamino-2,5-diethylhexane, and (2) has been prepared by a process as defined in claim 11.

3. As a novel composition of matter, a mixture of isomeric saturated aliphatic dinitriles having at least 10 carbon atoms per molecule and all the dinitriles in said mixture having the same number of carbon atoms and in which the cyano groups are separated by at least four carbon atoms and which mixture is further characterized by containing, in major amount isomeric dinitriles containing at least one $C_2$ saturated branch chain.

4. As a novel composition of matter, a mixture of α-ethylsuberonitrile, α,α'-diethyladiponitrile and sebaconitrile, said mixture being further characterized in that (1) its content of sebaconitrile is less than the sum of the α-ethylsuberonitrile and α,α'-diethyladiponitrile and (2) has been prepared by a process as defined in claim 9.

5. The method of preparing a mixture of saturated dinitriles in which the cyano groups are separated by at least 4 carbon atoms, which includes the steps of dimerizing a conjugated diolefin in the presence of an alkali metal in finely dispersed form and selected from the group consisting of sodium and potassium and in the presence of an active ether diluent and at least one dimerization activator, immediately carbonating the resulting organometallic diene intermediate, neutralizing the resulting dialkali metal salts of dicarboxylic acids to obtain the free diacids, hydrogenating the unsaturated diacids, reacting the saturated diacids with at least one ammonia releasing agent at a temperature between 100° and 350° C., whereby a mixture of saturated dinitriles is obtained.

6. The method of claim 5 wherein the conjugated diolefin is butadiene.

7. The method of claim 5 wherein the alkali metal is sodium.

8. The method of claim 5 wherein the ammonia releasing agent is urea.

9. The method of preparing a mixture of saturated $C_{10}$ dinitriles in which the cyano groups are seperated by at least 4 carbon atoms, which comprises reacting butadiene and finely dispersed sodium in the presence of a small amount of a polycyclic aromatic compound in a selected ether diluent, immediately carbonating the resulting mixture of disodiooctadienes, neutralizing the resulting mixture of disodium salts of $C_{10}$ dicarboxylic acids to obtain the free acids, hydrogenating the unsaturated acids and reacting the saturated diacids with ammonia at a temperature between 100° and 350° C., whereby a mixture of saturated $C_{10}$ dinitriles is obtained.

10. The method of preparing a mixture of saturated $C_{10}$ dinitriles in which the cyano groups are separated by at least 4 carbon atoms, which comprises reacting butadiene and finely dispersed sodium in the presence of a solid, friable attrition agent in a selected ether diluent; immediately carbonating the resulting mixture of disodiooctadienes, neutralizing the resulting mixture of disodium salts of $C_{10}$ dicarboxylic acids to obtain the free acids, hydrogenating the unsaturated acids and reacting the saturated diacids with ammonia at a temperature between 100° and 350° C., whereby a mixture of saturated $C_{10}$ dinitriles is obtained.

11. The method of preparing a mixture of saturated primary diamines in which the amino groups are separated by at least 6 carbon atoms, which includes the steps of dimerizing a conjugated diolefin in the presence of an alkali metal in finely dispersed form and selected from the group consisting of sodium and potassium and in the presence of an active ether diluent and at least one dimerization activator, immediately carbonating the resulting organometallic diene intermediate, neutralizing the resulting dialkali metal salts of dicarboxylic acids to obtain the free diacids, hydrogenating the unsaturated diacids, and reacting the saturated diacids with at least one ammonia releasing agent at a temperature between 100° and 350° C., and hydrogenating the resulting dinitrile mixture in the presence of ammonia and a hydrogenating catalyst, whereby a mixture of saturated primary diamines is obtained.

12. The method of claim 11 wherein the conjugated diolefin is butadiene.

13. The method of claim 11 wherein the alkali metal is sodium.

14. The method of claim 11 wherein the ammonia releasing agent is urea.

15. The method of preparing a mixture of saturated $C_{10}$ primary diamines in which the amino groups are separated by at least 6 carbon atoms, which comprises reacting butadiene and finely dispersed sodium in the presence of a small amount of a polycyclic aromatic compound in a selected ether diluent, immediately carbonating the resulting mixture of disodiooctadienes, neutralizing the resulting mixture of disodium salts of $C_{10}$ dicarboxylic acids to obtain the free diacids, hydrogenating the unsaturated diacids and reacting the saturated diacids with ammonia at a temperature between 100° and 350° C., and hydrogenating the resulting dinitrile mixture in the presence of ammonia and a hydrogenating catalyst, whereby a mixture of saturated $C_{10}$ primary diamines is obtained.

16. The method of preparing a mixture of saturated $C_{10}$ primary diamines in which the amino groups are separated by at least 6 carbon atoms, which comprises reacting butadiene and finely dispersed sodium in the presence of a solid, friable attrition agent in a selected ether diluent; immediately carbonating the resulting mixture of disodiooctadienes, neutralizing the resulting mixture of disodium salts of $C_{10}$ dicarboxylic acids to obtain the free diacids, hydrogenating the unsaturated acids and reacting the saturated diacids with ammonia at a temperature between 100° and 350° C., and hydrogenating the resulting dinitrile mixture in the presence of ammonia and a hydrogenating catalyst, whereby a mixture of saturated $C_{10}$ primary diamines is obtained.

References Cited in the file of this patent

UNITED STATES PATENTS

| | | |
|---|---|---|
| 2,132,388 | Berchet | Oct. 11, 1938 |
| 2,132,849 | Greenwalt et al. | Oct. 11, 1938 |
| 2,200,282 | Lazier | May 14, 1940 |
| 2,352,461 | Walker | June 27, 1944 |
| 2,584,527 | Albisetti et al. | Feb. 5, 1952 |
| 2,640,082 | Schreyer | May 26, 1953 |
| 2,647,146 | Arthur | July 28, 1953 |
| 2,716,662 | Cohen | Aug. 30, 1955 |

OTHER REFERENCES

Keil et al.: Chem. Abst., vol. 43, 6165 (1949).